(12) United States Patent
Sugimoto et al.

(10) Patent No.: US 9,185,747 B2
(45) Date of Patent: Nov. 10, 2015

(54) WIRELESS COMMUNICATION DEVICE

(71) Applicant: RENESAS ELECTRONICS CORPORATION, Kawasaki-shi, Kangawa (JP)

(72) Inventors: Hiroki Sugimoto, Kanagawa (JP); Koji Kubota, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 0 days.

(21) Appl. No.: 14/325,781

(22) Filed: Jul. 8, 2014

(65) Prior Publication Data

US 2014/0315540 A1 Oct. 23, 2014

Related U.S. Application Data

(63) Continuation of application No. 13/363,424, filed on Feb. 1, 2012, now Pat. No. 8,797,992.

(30) Foreign Application Priority Data

Feb. 3, 2011 (JP) .................................. 2011-021607

(51) Int. Cl.
*H04W 88/06* (2009.01)
*H04B 1/00* (2006.01)
(Continued)

(52) U.S. Cl.
CPC ............. *H04W 88/06* (2013.01); *H04B 1/0064* (2013.01); *H04W 52/0238* (2013.01);
(Continued)

(58) Field of Classification Search
None
See application file for complete search history.

(56) References Cited

U.S. PATENT DOCUMENTS 7,046,649 B2 5/2006 Awater et al.
7,844,222 B2 11/2010 Grushkevich
(Continued)

FOREIGN PATENT DOCUMENTS

JP 2001-217853 A 8/2001
JP 2009-512245 A 3/2009
(Continued)

OTHER PUBLICATIONS

Japanese Office Action received in corresponding Japanese Application No. 2011-021607 dated Sep. 25, 2014.

(Continued)

*Primary Examiner* — Donald Mills
(74) *Attorney, Agent, or Firm* — Mattingly & Malur, PC

(57) ABSTRACT

In a wireless communication device for performing plural wireless communications with different standards using the same frequency band, degradation of communication quality and communication speed due to communication interference is prevented, while drop in throughput and occurrence of frame loss are prevented. A first wireless communication section first performs wireless communication using a first frequency band and a second wireless communication section performs second wireless communication using a second frequency band with which at least a part of the first frequency band overlaps. The first wireless communication section analyzes a communication status signal which represents a signal pattern corresponding to communication status of the second wireless communication and then determines whether it is synchronous communication, and if it is, the first wireless communication section transmits/receives data in a non-communication period when communication in the synchronous communication is not performed, in synchronization with timing of the synchronous communication.

10 Claims, 9 Drawing Sheets

(51) Int. Cl.

| | |
|---|---|
| *H04W 52/02* | (2009.01) |
| *H04W 72/12* | (2009.01) |
| *H04W 72/02* | (2009.01) |
| *H04W 72/04* | (2009.01) |
| *H04W 28/04* | (2009.01) |
| *H04W 56/00* | (2009.01) |
| *H04W 4/00* | (2009.01) |
| *H04W 84/12* | (2009.01) |

(52) U.S. Cl.
CPC ......... *H04W 72/1215* (2013.01); *H04W 4/008* (2013.01); *H04W 28/04* (2013.01); *H04W 28/048* (2013.01); *H04W 56/00* (2013.01); *H04W 56/001* (2013.01); *H04W 72/02* (2013.01); *H04W 72/0446* (2013.01); *H04W 84/12* (2013.01); *Y02B 60/50* (2013.01)

(56) References Cited

U.S. PATENT DOCUMENTS

| | | | |
|---|---|---|---|
| 8,045,533 B2 | 10/2011 | Hirsch | |
| 8,121,144 B2 | 2/2012 | Bitran | |
| 8,203,991 B2 | 6/2012 | Thoukydides | |
| 8,346,171 B1 * | 1/2013 | Mack | 455/63.1 |
| 2001/0010689 A1 | 8/2001 | Awater et al. | |
| 2002/0061031 A1 | 5/2002 | Sugar et al. | |
| 2002/0167931 A1 | 11/2002 | Jang et al. | |
| 2003/0125019 A1 * | 7/2003 | Bajikar | 455/420 |
| 2004/0028003 A1 | 2/2004 | Diener et al. | |
| 2004/0048577 A1 | 3/2004 | Godfrey et al. | |
| 2004/0116075 A1 | 6/2004 | Shoemake et al. | |
| 2004/0162106 A1 | 8/2004 | Monroe et al. | |
| 2004/0242159 A1 | 12/2004 | Calderon et al. | |
| 2004/0259589 A1 * | 12/2004 | Bahl et al. | 455/553.1 |
| 2006/0030265 A1 | 2/2006 | Desai et al. | |
| 2011/0009060 A1 | 1/2011 | Hsu et al. | |

FOREIGN PATENT DOCUMENTS

| | | |
|---|---|---|
| JP | 2009-206934 A | 9/2009 |
| JP | 2009-540632 A | 11/2009 |
| JP | 2010-239260 A | 10/2010 |
| JP | 2012-530472 A | 11/2012 |
| WO | 2007/036687 A1 | 4/2007 |
| WO | 2007/143352 A1 | 12/2007 |
| WO | 2010/148100 A1 | 12/2010 |

OTHER PUBLICATIONS

3GPP TR 36.816 v1.0.0, Nov. 2010.

* cited by examiner

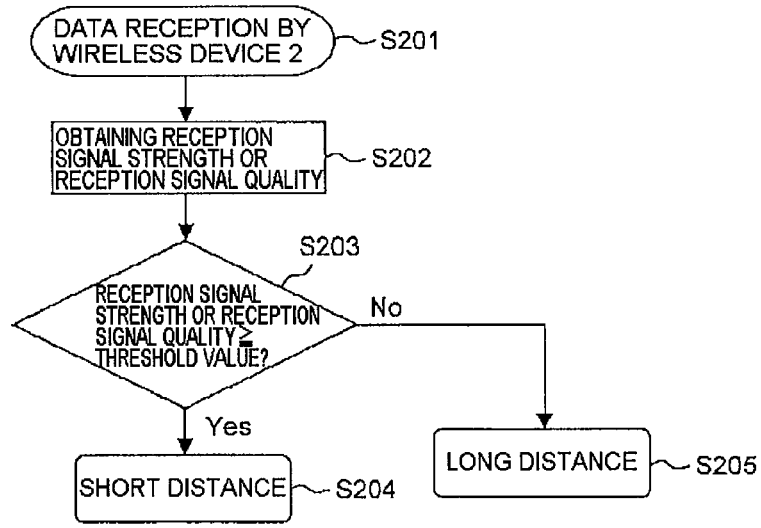

FIG. 7
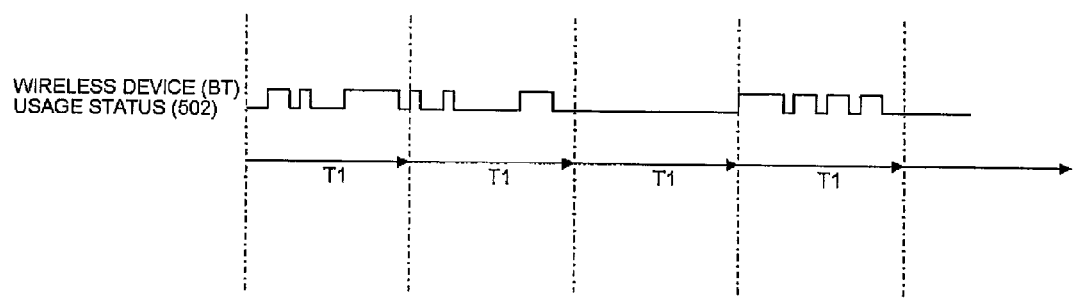
FIG. 8
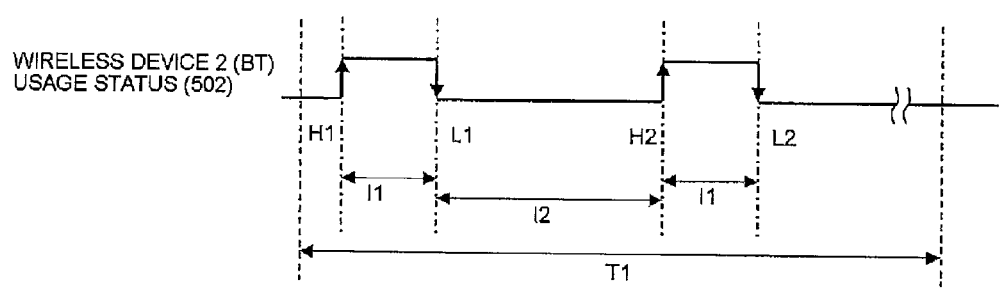
FIG. 9

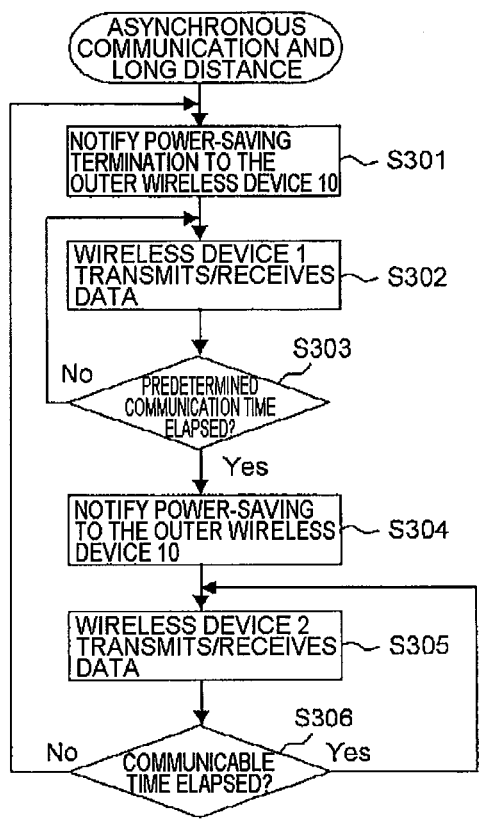

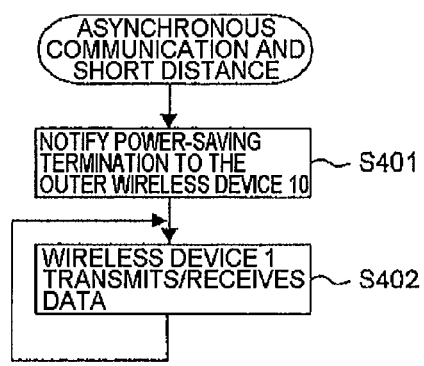

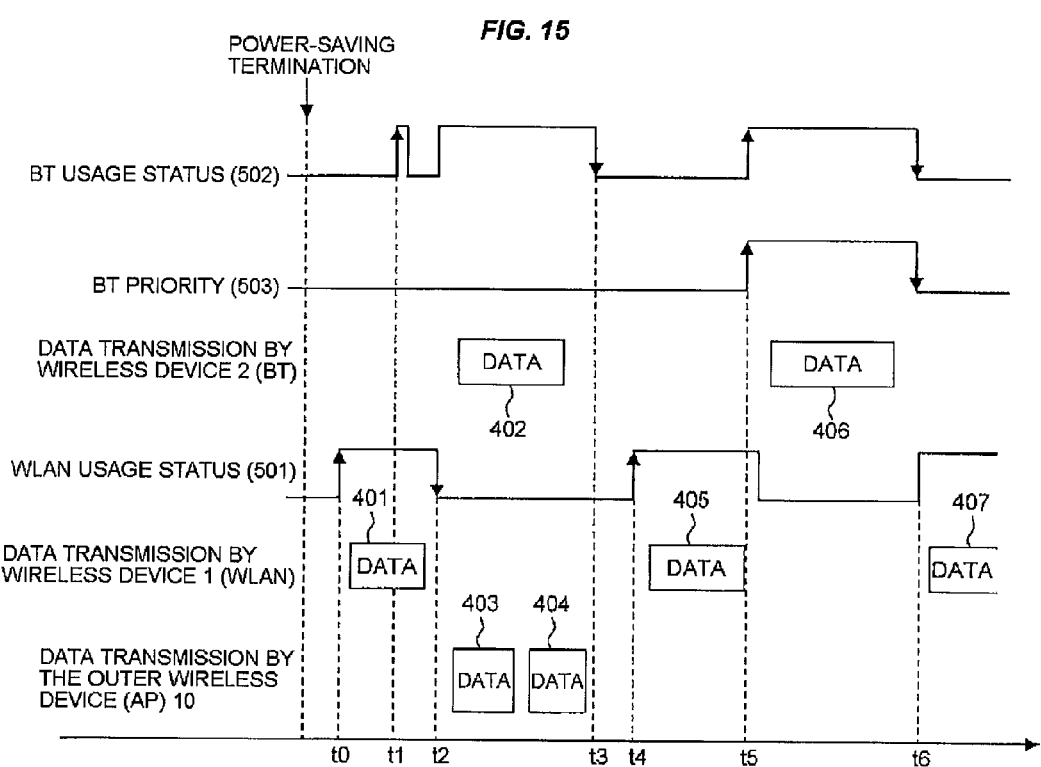

WIRELESS COMMUNICATION DEVICE

CROSS-REFERENCE TO RELATED APPLICATION

This application is a continuation of U.S. patent application Ser. No. 13/363,424, filed Feb. 1, 2012, which claims priority to Japanese Patent Application No. 2011-21607 filed on Feb. 3, 2011. The entire disclosures of these applications are incorporated herein by reference.

BACKGROUND

The present invention relates to a wireless communication device, and particularly relates to a technology that is effective when applied to a wireless communication device capable of performing a plurality of wireless communications with different standards.

Conventionally, for a plurality of wireless communications with different standards for which the same frequency band is used, there are following methods as technologies for preventing degradation of communication quality and communication speed caused by communication contention or interference. First, examples of method of physical avoidance include a method (Frequency Division Multiplex (FDM)) that uses different channels by dividing a frequency band, and a method (Code Division Multiplex (CDM)) that multiplexes communications by assigning different spread codes for the same frequency and the same time. Second, examples of method of probabilistic and dynamic avoidance include a frequency hopping method (Adaptive Frequency Hopping (AFH)) in the same frequency band, and a method that performs transmission control by means of carrier sense (Clear Channel Assessment (CCA)) before wireless communication.

Other effective methods include a method of avoiding power interference by setting an adequate distance between antennas for the respective wireless communications. However, recent downsizing of communication terminals often causes difficulty in adequately separating antennas from each other in a communication terminal. Even if the frequency bands of the wireless communications are separated adequately from each other, it is sometimes impossible to maintain communication quality or communication speed because of the power interference between antennas in a short distance. Particularly, in an audio source receiving device or the like that receives data, such as audio and music, quality is significantly degraded, depending on the communication status of another wireless device. It is more likely that conversing stably or listening to music becomes difficult. In this situation, for example, Japanese Patent Laid-Open No. 2001-217853 (Patent Document 1) discloses a method of avoiding interference between communications with different standards.

With a single communication device capable of performing communications by an IEEE802.11 wireless system and a Bluetooth (registered trademark, the same hereinafter) wireless system, the technology described in Patent Document 1 performs, by time division, data transmission by the IEEE802.11 wireless system and data transmission by the Bluetooth wireless system.

SUMMARY

However, when communications are performed uniformly by time division as in Patent Document 1, although communication interference can be prevented, problems are caused, such as a drop in throughput. Further, as a result of the inventors' consideration of a different method of preventing interference, in a case of adopting a communication control method that always prioritizes wireless communication which requires a high quality of data, such as audio or music, frame loss or the like caused by communication interference can be prevented. However, when communication is requested by a wireless communication side which requires high quality, the other wireless communication side is forced to interrupt communication, and thus frame loss occurs in the other wireless communication, resulting in degradation of the communication quality and the like of the other wireless communication.

The present invention has been made in view of the above circumstances and provides a wireless communication device for performing a plurality of wireless communications with different standards to prevent degradation in communication quality and communication speed due to communication interference, while preventing drop in throughput and occurrence of frame loss.

The other purposes and the new feature of the present invention will become clear from the description of the present specification and the accompanying drawings.

The following explains briefly the outline of a typical invention of the invention among the inventions disclosed in the present application.

A wireless communication device includes a first wireless communication section for performing first wireless communication using a first frequency band; and a second wireless communication section for performing second wireless communication using a second frequency band. The first wireless communication section analyzes a communication status signal that is output by the second wireless communication section and that represents a signal pattern corresponding to a communication status of the second wireless communication and then determines whether or not the second wireless communication is synchronous. If the second wireless communication is determined to be synchronous, the first wireless communication section performs data transmission/reception in a non-communication period when no synchronous communication is performed, in synchronization with the synchronous communication timing.

The following explains briefly the effect acquired by the typical invention among the inventions disclosed in the present application.

In a plurality of wireless communications with different standards, the present wireless communication device can prevent degradation in communication quality and communication speed due to communication interference, while preventing drop in throughput and occurrence of frame loss.

BRIEF DESCRIPTION OF THE DRAWINGS

FIG. 5 shows a WLAN communication environment.

FIG. 6 is a flowchart showing a determination process of the WLAN communication environment.

FIG. 7 is a diagram showing a status of BT communication by the wireless device 2.

FIG. 8 shows a communication status signal 502 that is output from the wireless device 2.

FIG. 9 shows a signal pattern of synchronous communication.

FIG. 13 is a flowchart showing a control method for performing the communications by the wireless device 1 and the wireless device 2 by time division.

FIG. 14 is a flowchart showing a communication control method that corresponds to the communication status and the priority of the wireless device 2.

FIG. 15 shows data transmission timing under communication control that corresponds to the communication status and the priority of the wireless device 2.

DETAILED DESCRIPTION

1. Outline of the Embodiment

Figure 1:
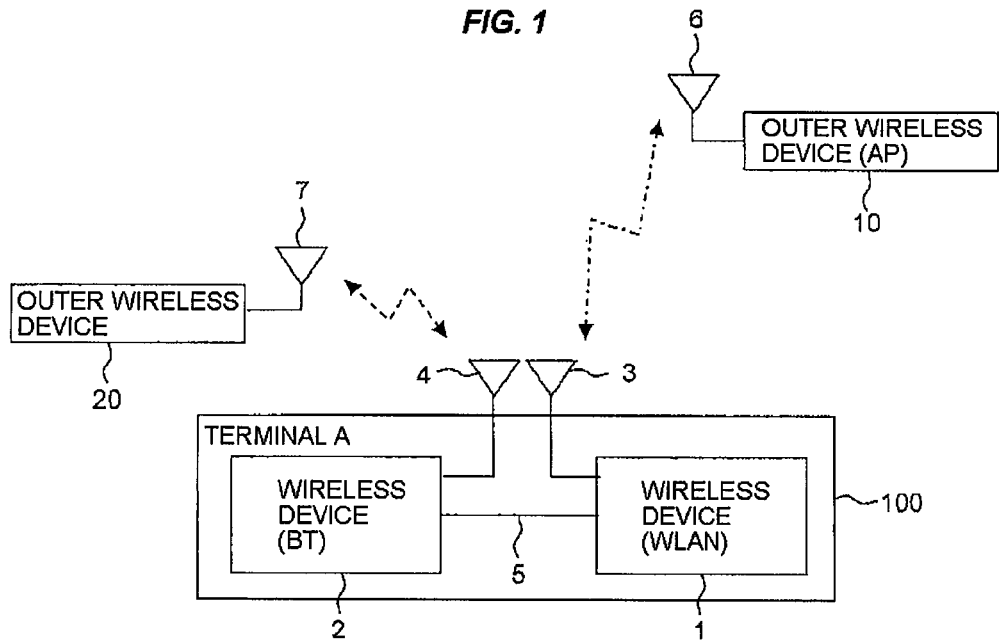
FIG. 1 is an outline of a wireless communication terminal in a first embodiment.

First, the outline of typical embodiments according to the invention disclosed by the present application will be described below. Reference numerals in the drawings, which are attached with parentheses and will be referred to in the description of the outline of the typical embodiment, represent only examples that are included in the concepts of the configuration elements attached with the reference numerals.

[1] (Wireless Communication Device that Determines a Communication Pattern (Synchronization) to Control Communication)

A wireless communication device (100) according to a typical embodiment of the invention includes a first wireless communication section (1) for performing first wireless communication (WLAN communication) using a first frequency band and a second wireless communication section (2) for performing second wireless communication (BT communication) using a second frequency band. The second wireless communication section transmits/receives data by the second wireless communication and outputs a communication status signal (502) that represents a signal pattern corresponding to a status of the second wireless communication. The first wireless communication section analyzes the signal pattern of the communication status signal and then determines whether or not the second wireless communication is synchronous. If the second wireless communication is determined to be synchronous, the first wireless communication section transmit/receive data in a non-communication period (302) when the synchronous communication is not performed, in synchronization with the synchronous communication timing.

For communication of audio data, such as music and audio conversation, which requires a higher communication quality, a synchronous communication method is mostly adopted. In this situation, the wireless communication device of the above item 1 determines whether or not the second wireless communication is synchronous. If it is synchronous communication, the first wireless communication section synchronizes with the second wireless communication and then performs wireless communication in a non-communication period of the synchronous communication. Thus, it is possible to prevent power interference between the first wireless communication and the second wireless communication, and to prevent frame loss and the like due to the interference.

Further, analyzing the pattern of the communication status signal that is output by the second wireless communication device enables easy determination whether or not the second wireless communication is synchronous, and synchronization with the timing of the second wireless communication. Still further, in a method that performs the first wireless communication and the second wireless communication uniformly by time division, it is impossible to perform the first wireless communication even when the second wireless communication is not performed in a period assigned as a period for the second wireless communication. On the other hand, the wireless communication device of item 1 detects and synchronizes with the timing of the synchronous communication by the second wireless communication, assigns a non-communication period as a period when the first wireless communication is possible. Thus, it is possible to prevent drop in throughput, compared with performing communication uniformly by time division.

[2] (Determining a Communication Pattern (Asynchronous) to Control Communication)

In the wireless communication device of the above item 1, the first wireless communication section analyzes the pattern of the communication status signal and then determines whether or not the second wireless communication is asynchronous. If it is determined to be asynchronous, the first wireless communication section determines a data transmission/reception mode, corresponding to the communication environment between the first wireless communication section and a first outer wireless device (10) that is the object of the first wireless communication section.

When one wireless communication is performed in a short distance and another wireless communication is performed in a long distance, the power interference effect becomes larger because the attenuation of reception power is large in the communication performed in the long distance. In contrast, when another wireless communication is performed in the short distance, the power interference effect tends to be small even if power interference is received, because the attenuation of reception power is small. A wireless communication device of the above item 2 determines the communication environment between the first wireless communication section and the first outer wireless device and then can select a data transmission/reception mode suitable for the communication environment.

[3] (Determination of Communication Environment)

In the wireless communication device of item 2, the first wireless communication section measures the reception signal strength or the reception signal quality of the first wireless communication. If the measured reception signal strength or the measured reception signal quality is higher than a predetermined threshold value, the first wireless communication section determines that the communication environment is good. Otherwise it determines that the environment is poor.

It is possible to easily determine whether the communication environment is good or poor.

[4] (Communication Control Corresponding to Communication Environment during Asynchronous Communication)

In the wireless communication device of item 3, the first wireless communication section asserts a notification signal (501) when performing the first wireless communication. The second wireless communication section stops the second wireless communication if the notification signal is asserted. Further, when the second wireless communication is determined to be asynchronous, the first wireless communication section, if determining that the communication environment is poor, controls the notification signal to perform the first wireless communication and the second wireless communication by time division. The first wireless communication section, if determining that the communication environment is good, transmits data when the second wireless communication is not performed.

When the communication environment is poor, such as when the first wireless communication is performed in a long distance, frame loss can be reduced by performing the first wireless communication and the second wireless communication by time division to avoid the effects of interference between the communications. Further, when the communication environment is good, such as when the first wireless communication is performed in a short distance, because the power interference effect tends to be small, it is possible to perform communication for which drop in throughput is prevented, by a method of communication that corresponds to the mutual communication statuses, instead of a method of communication by time division.

[5] (Stopping Transmission from AP during Synchronous Communication by BT)

In the wireless communication device of any one of items 1 to 4, when the second wireless communication is determined to be synchronous, the first wireless communication section further instructs to stop data transmission from the first outer wireless device in a communication period of the synchronous communication.

As described above, in the wireless communication device of any one of items 1 to 4, when the second wireless communication is synchronous, the first wireless communication section transmits data during non-communication periods of the synchronous communication. However, even when data transmission from the first wireless communication section is stopped during the second wireless communication, data may be transmitted from the first outer wireless device and then the second wireless communication may be affected. In this situation, when the second wireless communication is performed as synchronous communication, communication interference can be prevented by stopping not only data transmission from the first wireless communication section but also data transmission from the first outer wireless device.

[6] (Stopping Transmission from AP during BT Asynchronous Communication and in Poor Communication Environment)

Further, in the wireless communication device of any one of items 2 to 5, if the second wireless communication is determined to be asynchronous and moreover the communication environment is determined to be poor, the first wireless communication section further instructs to stop data transmission from the first outer wireless device when the second wireless communication is performed.

As described above, the first outer wireless device may transmit data even during the second wireless communication. In this case, if the communication environment for the first wireless communication is poor, the first wireless communication section may be able to receive no data transmitted from the first outer wireless device. In this situation, it is possible to reduce frame loss of the data transmitted from the first outer wireless device, by limiting data transmission from the first outer wireless device in poor communication environment of the first outer wireless communication.

[7] (Transmission Control by a Sleep Signal)

In the wireless communication device of item 5 or 6, the instruction to stop the data transmission is carried out by transmitting, to the first outer wireless device, a sleep signal (power-saving notice) that represents the transition of the first wireless communication section into a power-saving state.

It is possible to easily stop data transmission from the first outer wireless device. When the first wireless communication is performed by a wireless system that is compliant to the IEEE 802.11 standard, it is only required to use an existing protocol (power-saving notification function), and it is unnecessary to prepare a new protocol to instruct to stop the data transmission.

[8] (Priority Signal)

In the wireless communication device of any one of items 3 to 7, the second wireless communication section further outputs a priority signal (503) representing that the second wireless communication is performed prior to the first wireless communication. When the second wireless communication is determined to be asynchronous and the communication environment is determined to be good, the first wireless communication section transmits no data when the priority signal is asserted.

In a state that communication is controlled corresponding to each of the communication statuses, even when the second wireless communication and the first wireless communication conflict with each other, the second wireless communication can be performed preferentially.

[9] (Determining a Communication Pattern (Congested State) to Control Communication)

In the wireless communication device of any one of items 2 to 8, before determining whether the communication is synchronous or asynchronous, the first wireless communication section determines whether or not the second wireless communication is in a congested state. If it is in the congested state, the first wireless communication section stops data transmission/reception.

[10] (Determining a Communication Pattern (Unused State) to Control Communication)

In the wireless communication device of any one of items 1 to 9, the first wireless communication section determines whether or not the second wireless communication is performed. If it is not performed, the first wireless communication section transmits/receives data at desired timing.

In a state that the second wireless communication is not performed, the first wireless communication section can transmit/receive data at desired timing. Throughput does not drop, compared to a method that performs communication at timings uniformly assigned by time division.

[11] (Method of Determining Signal Pattern)

In the wireless communication device of item 10, the communication status signal is a digital signal that is set to a first value during communication and is set to a second value during non-communication. Further, when the communication status signal has not become the first value in a predetermined time, the first wireless communication section determines that the second wireless communication is not performed. In the predetermined time, when the total time when the communication status signal has been the first value is a predetermined time or more, the first wireless communication section determines that the second wireless communication is in a congested state. When the same signal pattern based on a time when the communication status signal is the first value and a time when the communication status signal is the second value is detected plural times in the predetermined time, the first wireless communication section determines that the second wireless communication is synchronous. In the other cases, the first wireless communication section determines that the second wireless communication is asynchronous.

It is possible to easily determine the status of the second wireless communication.

[12] (Wireless Communication Device (Independent) that Stops Transmission from AP During BT Communication)

A wireless communication device (100) in another typical embodiment according to the invention performs first wireless communication (WLAN communication) that uses a first frequency band, and second wireless communication (BT communication) that uses a second frequency band with which at least a part of the first frequency band overlaps. When performing the second wireless communication, the wireless communication device instructs to stop data transmission from an outer wireless device (10) that is the object of the first wireless communication.

As described above, communication is limited in a state that frame loss of transmission data from the first outer wireless device tends to occur. Accordingly, it is possible to reduce frame loss of transmission data from the first outer wireless device, due to the interference from the second wireless communication. Also, it is possible to prevent interference by data transmission from the first outer wireless device on the second wireless communication.

[13] (Transmission Control by Sleep Signal)

In the wireless communication device of item 12, the instruction to stop the data transmission is performed by transmitting, to the outer wireless device, a sleep signal (power-saving notice) that represents transition into a power-saving state.

As with item 7, it is possible to easily stop data transmission from the first outer wireless device.

[14] (Wireless Communication Device (Independent) that Determines Communication Pattern to Control Communication)

A wireless communication device (100) in another typical embodiment according to the invention includes a first wireless communication section (1) for performing first wireless communication (WLAN communication) that uses a first frequency band; and a second wireless communication section (2) for performing second wireless communication (BT communication) that uses a second frequency band with which at least a part of the first frequency band overlaps. The second wireless communication section transmits/receives data by the second wireless communication, and outputs a communication status signal (502) that is set to a first value during communication and is set to a second value during non-communication. Further, the first wireless communication section analyzes a pattern of the communication status signal in a predetermined time. When the communication status signal has not become the first value in the predetermined time, the first wireless communication section determines that the second wireless communication is not performed. In the predetermined time, the total time when the communication status signal has been the first value is a predetermined time or more, the first wireless communication section determines that the second wireless communication is in a congested state. When the same signal pattern based on a time when the communication status signal has been the first value and a time when the communication status signal has been the second value, has been detected plural times during the predetermined time, the first wireless communication section determines that the second wireless communication is synchronous. In the other cases, the first wireless communication section determines that the second wireless communication is asynchronous and determines an operation mode of data transmission/reception, in accordance with the determination result.

It is possible to easily determine the status of the second wireless communication and the operation mode of data transmission/reception in the first wireless communication.

[15] (Determination on Communication Environment)

In the wireless communication device of item 14, when determining that the second wireless communication is asynchronous, the first wireless communication section measures the reception signal strength or the reception signal quality of the first wireless communication. If the measured reception signal strength or the measured reception signal quality of the first wireless communication is higher than a predetermined threshold value, the first wireless communication section determines that the communication environment is good. If not, the first wireless communication section determines that it is poor.

It is possible to easily determine whether the communication environment is good or poor and to easily change the operation mode, in accordance with the communication environment.

[16] (Resuming Data Transmission from AP Upon Notification of Power-Saving Termination)

In the wireless communication device of any one of items 7 to 11, the first wireless communication section starts communication, by transmitting to the first outer wireless device a signal that notifies power-saving termination.

It is possible to easily resume communication from the first outer wireless device to the wireless communication device.

[17] (Resuming Data Transmission from AP Upon Request for Frame Acquisition)

In the wireless communication device of any one of items 7 to 11, the first wireless communication section starts communication, by transmitting to the first outer wireless device a signal to request frame acquisition.

It is possible to easily resume communication from the first outer wireless device to the wireless communication device.

[18] (Second Frequency Band with which at Least a Part of First Frequency Band Overlaps)

A wireless communication device (100) in another typical embodiment according to the invention includes a first wireless communication section for performing first wireless communication that uses a first frequency band; and a second wireless communication section for performing second wireless communication that uses a second frequency band with which at least a part of the first frequency band overlaps. The second wireless communication section transmits/receives data by the second wireless communication, and outputs a communication status signal (502) that represents a signal pattern corresponding to the status of the second wireless communication. The first wireless communication section analyzes the signal pattern of the communication status signal and then determines whether or not the second wireless communication is synchronous. When a determination result is synchronous communication, the first wireless communication section transmits/receives data in a non-communication period (302) when communication in the synchronous communication is not performed, in synchronization with communication timing of the synchronous communication.

As with item 1, it is possible to prevent power interference between the first wireless communication and the second wireless communication and then to prevent occurrence of frame loss and the like due to interference. Further, it is possible to easily determine whether or not the second wireless communication is synchronous, and further to synchronize the first wireless communication with the timing of the second wireless communication. Further, by the wireless communication device of item 18, as with item 1, it is possible to prevent drop in throughput, compared with performing communication uniformly by time division.

2. Detailed Description of Preferred Embodiments

Preferred embodiments will be described below in further details.

Embodiment 1

FIG. 1 is an outline of a wireless communication terminal in Embodiment 1.

A wireless communication 100 (hereinafter, referred to merely as 'terminal') shown in the figure is a portable terminal, such as a mobile phone or a smart phone for performing first wireless communication that uses a predetermined frequency band and second wireless communication that uses a predetermined frequency band. The frequency bands used by the first wireless communication and the second wireless communication may differ from each other, may be close to each other, and may be overlapping with each other at least partially. The following is described with an assumption that the first wireless communication (hereinafter, also referred to as 'WLAN communication') complies with the IEEE 802.11 standard using the 2.4-GHz band, and the second wireless communication (hereinafter, also referred to as 'Bluetooth (BT) communication') complies with the IEEE 802.15 standard using the 2.4-GHz band.

The terminal 100 has a wireless device 1 and a wireless device 2. The wireless device 1 performs WLAN communication via an antenna 3 with a outer wireless device (Access Point (AP)) 10 that is installed within a communicable range. On the other hand, the wireless device 2 performs BT communication via an antenna 4 with a outer wireless device 20 that is installed within a communicable range. The outer wireless device 20 may be a wireless head phone.

The wireless device 1 and the wireless device 2 are adjacent to each other in the terminal 100, and are connected with each other by a signal line 5. Methods of connecting the wireless devices 1 and 2 include a two-line control method, which connects the devices by two signal lines, and a three-line control method, which connects the devices by three signal lines.

Figure 2:
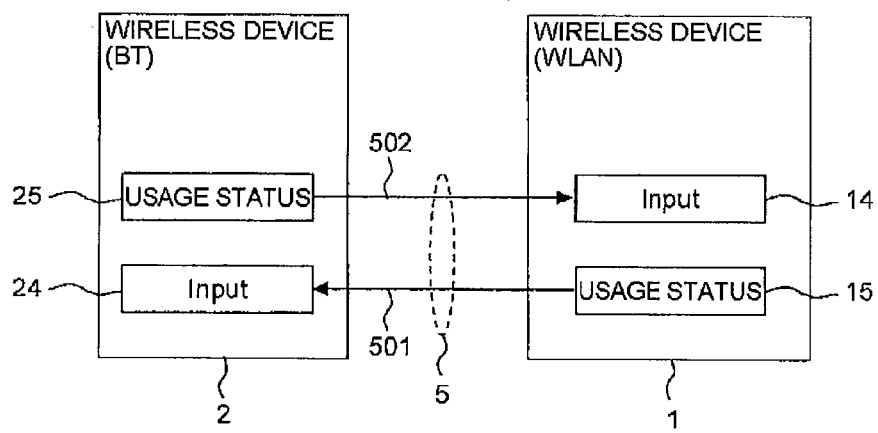
FIG. 2 shows a method of connecting a wireless device 1 and a wireless device 2 (via two lines).
Figure 3:
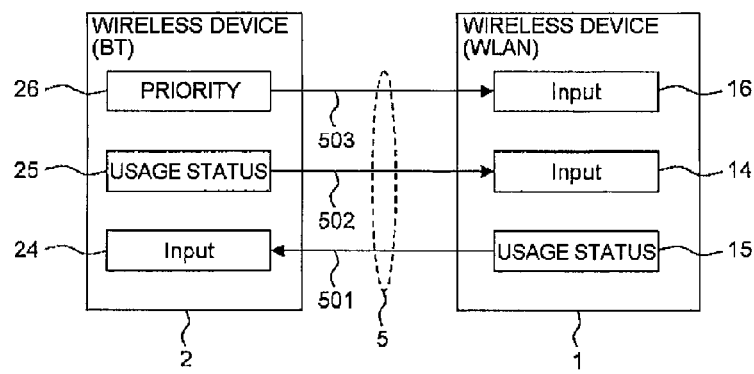
FIG. 3 shows a method of connecting a wireless device 1 and a wireless device 2 via three lines.

FIGS. 2 and 3 show methods of connecting the wireless device 1 and the wireless device 2.

FIG. 2 shows a connection between the wireless device 1 and the wireless device 2 by two signal lines. FIG. 3 shows a connection between the wireless device 1 and the wireless device 2 by three signal lines.

When the wireless devices are connected by two signal lines, as shown in FIG. 2, an output port 15 of the wireless device 1 and an input port 24 of the wireless device 2 are connected by a signal line 501. A signal (hereinafter, referred to as 'communication status signal 501') representing the status of the WLAN communication by the wireless device 1 is output to the signal line 501. Further, an output port 25 of the wireless device 2 and an input port 14 of the wireless device 1 are connected by a signal line 502, and a signal (hereinafter referred to as 'communication status signal 502') representing the status of the BT communication by the wireless device 2 is output to the signal line 502. These connections allow the wireless device 1 and the wireless device 2 to recognize the mutual communication statuses.

When the wireless devices are connected by three signal lines, as shown in FIG. 3, in addition to the connections by the above-mentioned signal lines 501 and 502, an output port 26 of the wireless device 2 and an input port 16 of the wireless device 1 are connected by a signal line 503. A signal (hereinafter referred to as 'priority signal 503') representing the priority of the BT communication by the wireless device 2 is output to the signal line 503. The priority signal 503 is a digital signal representing a low priority or a high priority, and is used by the priority control to be described. In the following description, the terminal 100 will be described with an assumption that the wireless device 1 and the wireless device 2 are connected by a three-line control method in the terminal 100.

Figure 4:
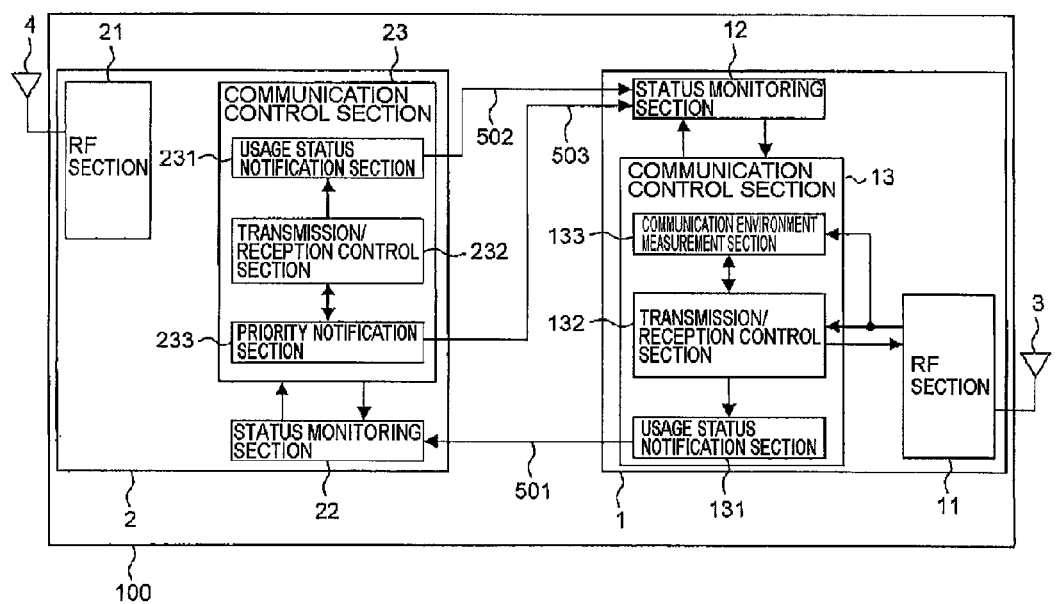
FIG. 4 is a block diagram showing an inner configuration of a wireless communication terminal 100.

FIG. 4 is a block diagram showing an inner configuration of the terminal 100.

The wireless communication 1 (WLAN) has a status monitoring section 12, a communication control section 13, and an RF section 11. The status monitoring section 12 and the communication control section 13 are functional sections that are implemented by a microprocessor for executing processes by programs and implemented by LSI for baseband processing.

The status monitoring section 12 receives a priority signal 503 output to the signal line 503 and a communication status signal 502 output to the signal line 502, which are output from the wireless device 2, determines, based on the input signals, the communication status of the wireless device 2, and provides the communication control section 13 with a determination result. The determination method is described later in detail.

The communication control section 13 includes, for example, a transmission/reception control section 132, a usage status notification section 131, and a communication environment measurement section 133. Controlled by the transmission/reception control section 132, the usage status notification section 131 outputs a communication status signal 501 representing the status of WLAN communication performed by the wireless device 1. The communication status signal 501 is a digital signal. The signal is set high (High) when the wireless device 1 is performing WLAN communication and is set low (Low) when it is not.

The communication environment measurement section 133 measures the reception signal strength or the reception signal quality for each frame received via the antenna 3, and based on the measured reception signal strength or measured reception signal quality, determines the WLAN communication environment. In this method, the communication environment measurement section 133 monitors the communication environment between the wireless device 1 and the outer wireless device 10. A reception signal strength is an index representing the magnitude of a reception signal including noise. If a frame signal expected to be received is strong, the signal can be received even when it includes noise. Further, even when only noise is included, the reception signal strength becomes high. Not only noise but also an interference signal causes the same. A reception signal quality is an index representing the signal quality of a desired frame, and is expressed by the ratio between a frame signal expected to be received and a noise signal (SNR: Signal to Noise Ratio). Even when a frame signal is weak, the frame signal can be received if noise also is weak. Not only an SNR but also an SIR (Signal to Interference Ratio), a D/U ratio, or the like is used.

FIG. 5 shows determination kinds of the WLAN communication environment.

As shown in the figure, the communication environment between the wireless device 1 and the outer wireless device 10 is roughly categorized into a short distance and a long distance. Generally, the reception signal strength, the reception signal quality, or the communication quality is inversely proportional to the communication distance. The communication distance is short if the reception signal strength or the reception signal quality is high. The communication distance is long if the reception signal strength or the reception signal quality is low.

FIG. 6 is a flowchart showing a determination process of the WLAN communication environment.

First, the communication environment measurement section 133 obtains reception data per frame via the antenna 3 from the RF section 11 (S201). The communication environment measurement section 133 measures the reception signal strength or the reception signal quality, based on the obtained reception data (S202), and then determines whether or not the measured reception signal strength or measured reception signal quality is larger than a predetermined threshold value (S203). If the measured reception signal strength or the measured reception signal quality is larger than the predetermined threshold value, the communication environment measurement section 133 determines that the WLAN communication environment is of a short distance (S204). If the measured reception signal strength or the measured reception signal quality is lower than the predetermined threshold value, the communication environment measurement section 133 determines that the WLAN communication is of a long distance (S205).

Based on a determination result of the communication status of the wireless device 2 by the status monitoring section 12, and a measurement result of the communication environment by the communication environment measurement section 133, the transmission/reception control section 132 controls data transmission/reception via the antenna 3 and the RF section 11, and controls communication of the wireless device 2 by controlling the usage status notification section 131. Communication control by the transmission/reception control section 132 will be described later in detail.

The RF section 11 receives a reception signal from the antenna 3, converts the received reception signal into a signal with a frequency and amplitude processable by the communication control section 13 in the later stage, and outputs the signal. Further, the RF section 11 converts the transmission signal generated by the communication control section 13 into a signal with a frequency and amplitude transmittable by the antenna 3, and outputs the signal. The RF section 11 may be a one-chip RFIC (Radio-Frequency Integrated Circuit), and may be configured as a one-chip system LSI including the baseband sections of the status monitoring section 12 and the communication control section 13.

The wireless device 2 has a status monitoring section 22, a communication control section 23, and an RF section 21. The status monitoring section 22 and the communication control section 23 are functional sections implemented by a microprocessor for execution of program processes, and implemented by an LSI for baseband processing.

The status monitoring section 22 receives a communication status signal 501 from the wireless device 1, and based on the received signal, determines whether or not the wireless device 1 is in communication. When the communication status signal 501 is High, the status monitoring section 22 determines that the wireless device 1 is in communication. When the communication status signal 501 is Low, the status monitoring section 22 determines that the wireless device 1 is performing no communication. The communication control section 23 obtains a determination result.

The communication control section 23 includes a transmission/reception control section 232, a usage status notification section 231, and a priority notification section 233. Controlled by the transmission/reception control section 232, the usage status notification section 231 outputs a communication status signal 502 representing the status of BT communication by the wireless device 2. The communication status signal 502 is output at a timing earlier (several µs earlier) than a timing of start of communication. The communication status signal 502 will be described later in detail.

Controlled by the transmission/reception control section 232, the priority notification section 233 outputs a priority signal 503 that requests performing BT communication by the wireless device 2 in prior to WLAN communication. When the priority signal 503 is High, it indicates high priority to represent a request for high priority to BT communication. The priority signal 503 is used for communication control by priority that will be described later.

Based on a determination result by the status monitoring section 22, the transmission/reception control section 232 controls transmission of data via the antenna 4 and the RF section 21, controls the usage status notification section 231 and the priority notification section 233, and then, outputs the communication status signal 502 and the priority signal 503. The transmission/reception control section 232 performs no BT communication when the wireless device 1 is in communication. It performs BT communication at desired timing when the wireless device 1 is not in communication.

The RF section 21 receives a reception signal from the antenna 4 to the RF section 21, converts the received reception signal into a signal with a frequency and amplitude processable by the communication control section 23, and outputs the signal. The RF section 21 also converts a transmission signal generated by the communication control section 23 into a signal with a frequency and amplitude transmittable from the antenna 4 and outputs the signal. The RF section 21 may be a one-chip RFIC, similarly to the above-mentioned RF section 11, and may be configured as a one-chip system LSI including the baseband section of the status monitoring section 22 and the communication control section 23.

A method of determining the communication status of BT communication, by the status monitoring section 12 of the wireless device 1, will be described.

FIG. 7 shows a communication status of BT communication by the wireless device 2.

As shown in the figure, the communication status of BT communication is divided into four unused state, congested state, synchronous communication, and asynchronous communication. The unused state refers to a state in which BT communication is not performed by the wireless device 2. The congested state refers to a state in which BT communication is frequently performed by the wireless device 2, and communication is congested. The synchronous communication refers to a state in which synchronous communication, which is communication performed with a constant cycle and a constant time length, is performed. The asynchronous communication refers to a state in which communication, which is not synchronous communication, is performed though not so frequently as the congested state.

The above four states are determined when the status monitoring section 12 analyzes the communication status signal 502.

FIG. 8 shows a communication status signal 502 output from the wireless device 2.

As shown in the figure, the communication status signal 502 is output as a digital signal. A section High represents that BT communication is performed. A section Low represents that BT communication is not performed. The status monitoring section 12 obtains statistic information on changes of rising and falling of the communication status signal 502 during a predetermined time period T1, and based on the obtained statistic information, determines the communication status of the wireless device 2. The statistic information per time T1 is measured N times (The number N is an integer of 1 or more). Further, the statistic information obtained by the status monitoring section 12 is stored in a storage area such as a memory, which is not shown. To simplify description, a concrete method of determination will be described below, assuming that the number of measurements N is 1.

For example, when neither change in rising of the communication status signal 502 nor no High section occurs during a time T1, the communication state is determined to be in the unused state. Further, in case the total time, in which the signal level is High, exceeds a predetermined threshold value during a time T1, the communication state is determined to be in the congested state. The predetermined threshold value is not particularly limited, and is a time that is 80% of the time T1.

If the communication status signal 502 is the signal pattern of synchronous communication during a time T1, the communication is determined to be synchronous. FIG. 9 shows a signal pattern of synchronous communication. As shown in the figure, the same signal pattern with a cycle (I1+I2) and a High section I1 is repeated in synchronous communication. In this situation, the status monitoring section 12 determines synchronization, based on each High section 11 of the communication status signal 502 from a rising edge to a falling edge, and each Low section 12 from the falling edge to the next rising edge. If the High sections (I1) are the same and the same signal pattern (I1+I2) is detected m (The number m is an integer of 2 or more.) times, the BT communication is determined to be synchronous.

In a case that does not correspond to any of the above-mentioned three states, the status monitoring section 12 determines the communication to be asynchronous.

Figure 10:
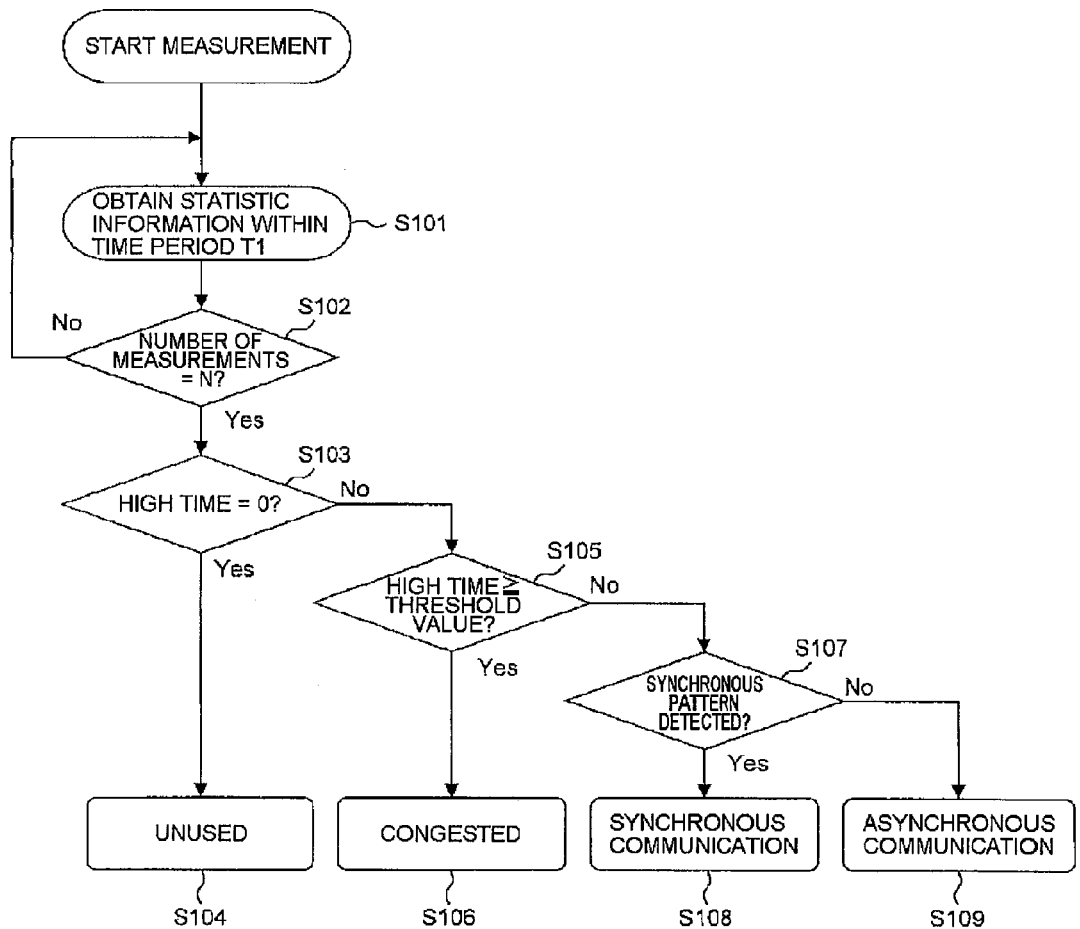
FIG. 10 is a flowchart showing a determination process of the communication status of the wireless device 2.

FIG. 10 is a flowchart showing a determination process of the communication status of the wireless device 2.

The status monitoring section 12 starts measuring the communication status signal 502, and obtains the statistic information on the communication status signal 502 during a predetermined time T1 (S101). Then, the status monitoring section 12 determines whether or not the number of measurements has reached N (S102). If the number of measurements has not reached N, the signal is measured again to obtain the statistic information. If the number of measurements has reached N, the status monitoring section analyzes the obtained statistic information, and determines presence or absence of a High section during the time T1 (S103). If the status monitoring section 12 determines that a High section is absent, the status monitoring section 12 determines that the wireless device 2 is in the unused state (S104). If the status monitoring section 12 determines that the High section is present in step S103, the status monitoring section 12 determines whether or not the total time of High sections exceeds the predetermined threshold value (S105). If the total time of High sections exceeds the predetermined threshold value, the status monitoring section 12 determines that BT communication is in the congested state (S106). In step S105, if the total time of High sections does not exceed the predetermined threshold value, the status monitoring section 12 determines presence or absence of the signal pattern of synchronous communication (S107). If the signal pattern of synchronous communication has been detected by the above-mentioned method, the status monitoring section 12 determines that the BT communication is synchronous (S108). If the signal pattern of synchronous communication has not been detected, the status monitoring section 12 determines that the BT communication is asynchronous (S109).

The method of controlling communication by the communication control section 13 will be described below.

As has been described above, the transmission/reception control section 132 of the communication control section 13 controls data transmission/reception and the communication by the wireless device 2, based on a determination result of the BT communication by the status monitoring section 12. A concrete control method corresponding to the determination result of the BT communication is as follows.

(1) If Determination Result of Communication Status of Wireless Device 2 is Unused State:

If the determination result of the communication status of the wireless device 2 is the unused state, the transmission/reception control section 132 performs WLAN communication at desired timing. In this case, even if WLAN communication is performed, as the WLAN communication neither affects BT communication nor is affected by BT communication, the wireless device 2 performs communication at desired timing.

(2) If Determination Result of Communication Status of Wireless Device 2 is Congested State:

If the determination result of the communication status of the wireless device 2 is the congested state, the transmission/reception control section 132 performs no WLAN communication. If the communication status of the wireless device 2 is the congested state, it is in a state requiring that BT communication occupies the communication. In this state, if control is performed to perform WLAN communication and BT communication by time division, the throughput of BT communication drops, which is inappropriate. Accordingly, the transmission/reception control section 132 performs no WLAN communication until the congested state of BT communication is resolved.

(3) If Determination Result of Communication Status of Wireless Device 2 is Synchronous Communication:

If the determination result of the communication status of the wireless device 2 is synchronous communication, to perform WLAN communication in non-communication periods during the synchronous communication of BT communication, the transmission/reception control section 132 adjusts timing of data transmission from the wireless device 1, and also adjusts timing of data transmission from the outer wireless device (AP) 10.

Figure 11:
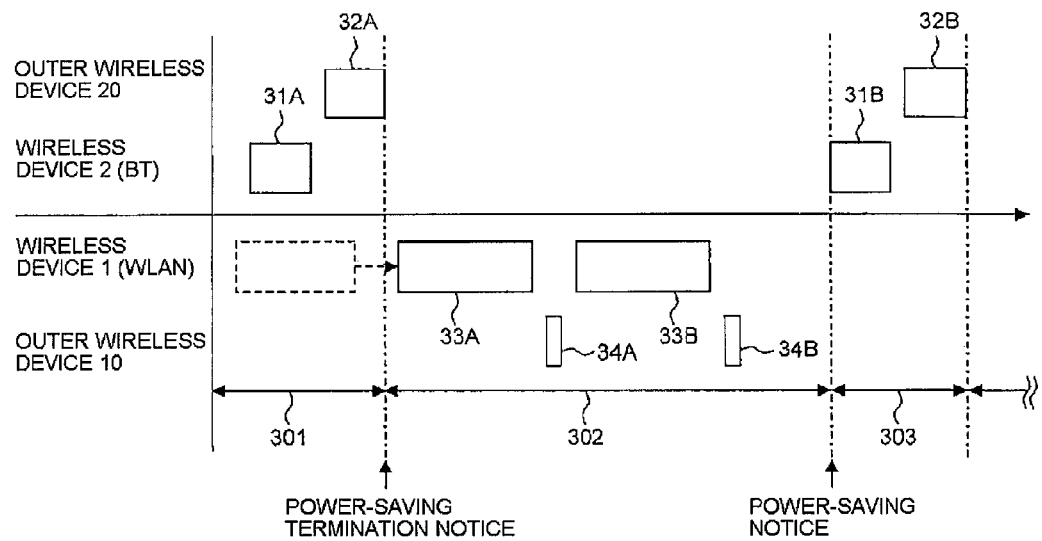
FIG. 11 shows a method of adjusting the data transmission timing of the wireless device 1.

First, adjustment of the timing of data transmission from the wireless device 1 will be described. FIG. 11 shows a data transmission timing of the wireless device 1.

The upper half of the figure shows the timing of BT communication. The lower half of the figure shows the timing of WLAN communication. Reference numerals 31A and 31B represent data transmitted from the wireless device 2. Reference numerals 32A and 32B represent data transmitted from the outer wireless device 20. Further, reference numerals 33A and 33B represent data transmitted from the wireless device 1. Reference numerals 34A and 34B represent data transmitted from the outer wireless device 10. Still further, the periods represented by reference numerals 301 and 303 are communication periods in synchronous communication of BT communication. The period represented by reference numeral 302 is a non-communication period in synchronous communication of the BT communication.

If the determination result received from the status monitoring section 12 is synchronous communication, the transmission/reception control section 132 detects, as shown in FIG. 11, the communication timing of this synchronous communication, and in synchronization with the timing, controls to perform WLAN communication during non-communication periods 302 in the synchronous communication of BT communication. Compared with performing WLAN communication and BT communication uniformly by time division, as it is possible to effectively use periods where communication is not performed, drop in throughput can be reduced.

As described above, the transmission/reception control section 132 controls the timing of data transmission from the wireless device 1. It also controls the timing of data transmission from the outer wireless device (AP) 10. The timing of data transmission from the outer wireless device 10 is controlled by transmitting, to the outer wireless device 10, a power-saving notice representing that the wireless device 1 transits into the power-saving state (sleep mode).

A power-saving function of the wireless device 1 is described. The wireless device 1 has a power-saving function for transit to a power-saving state in a case that no data is transmitted/received for a predetermined period. The outer wireless device (AP) 10 needs to recognize whether or not the wireless device 1 is in the power-saving state. Transit to or return from the power-saving state of the wireless device 1 is notified by information related to the power-saving state of the wireless device 1 included in the header of a transmission frame transmitted from the wireless device 1 to the outer wireless device 10. Hereinafter, notice of transit to the power-saving state by this information is referred to as a power-saving notice. Notice of return from the power-saving state is referred to as a power-saving termination notice.

Upon receipt of a power-saving notice from the wireless device 1, the outer wireless device 10 accumulates data (hereinafter, also referred to as transmission frame) to be transmitted to the wireless device 1 into a buffer or the like in the outer wireless device 10 for a permitted time. Further, the outer wireless device 10 transmits a beacon frame including information for identification with a constant cycle (approximately 100 ms). A beacon frame includes management information indicating whether the outer wireless device 10 has accumulated transmission frames of the wireless device 1. Accordingly, the wireless device can determine presence or absence of accumulated transmission frames addressed to the device, by receiving beacon frames that are periodically transmitted. Because the transmission time of a beacon frame is shorter than the transmission time of user data, the effect of power interference caused by transmission of a beacon frame is small. Further, the above-mentioned management information and other control information included in a beacon frame are not data to be transmitted in response to a request from a user or the like.

In order that the wireless device 1 obtains a frame accumulated in the outer wireless device 10, the wireless device 1 transmits a frame acquisition request to the outer wireless device 10. Thus, the outer wireless device 10 is permitted to transmit an accumulated frame to the wireless device 1, and the outer wireless device 10 transmits one accumulated frame while maintaining the power-saving state. To obtain a plurality of accumulated frames, the wireless device 1 makes a frame acquisition request plural times. If the wireless device 1 issues a power-saving termination notice to the outer wireless device 10 and then terminates the power-saving state, the outer wireless device 10 transmits all of accumulated frames. If the transmission timing of a beacon frame transmitted from the wireless device 2 with a constant cycle and the timing of synchronous communication by the wireless device 1 are overlapped with each other, the wireless device 2 may be unable to receive a beacon frame. Even when the wireless device 2 can receive no beacon frame in a certain number of times, the wireless device 2 can confirm presence or absence of accumulated frames on the outer wireless device 20, by transmitting a frame acquisition request to the outer wireless device 20.

Using this function, the communication control section 13 transmits a power-saving notice to the outer wireless device 10 when the wireless device 2 starts BT communication, and the wireless device 1 transmits a frame acquisition request to the outer wireless device 10 when the wireless device 1 starts WLAN communication. Otherwise, the communication control section 13 transmits a power-saving notice to the outer wireless device 10 when the wireless device 2 starts BT communication, and transmits a power-saving termination notice to the outer wireless device 10 when the wireless device 1 starts WLAN communication. As shown in FIG. 11, in the periods 301 and 303 when the wireless device 2 performs BT communication, no data is transmitted from the outer wireless device 10, and data is transmitted in the period 302 when the wireless device 1 performs WLAN communication. Thus, it is possible to prevent occurrence of frame loss and the like, caused by power interference due to BT communication, on transmission data from the outer wireless device 10. Particularly, for communication of audio data, such as music and audio communication, which uses synchronous communication, the above-mentioned control method is effective because communication with a higher quality is required. As described above, by recognizing non-communication sections of synchronous communication of BT communication, it is possible to improve the mutual communication qualities during synchronous communication of BT communication.

(4) If Determination Result of Communication Status of Wireless Device 2 is Asynchronous Communication:

If the determination result of communication status of the wireless device 2 is asynchronous communication, the transmission/reception control section 132 determines a communication control method, corresponding to the communication status of the wireless device 2, the communication status having been notified from the status monitoring section 12, and the communication environment of the wireless device 1. Concretely, if the determination result of the communication status of the wireless device 2, the determination result having been notified from the status monitoring section 12, is asynchronous communication, the transmission/reception control section 132 obtains a determination result on the communication environment of WLAN communication from the communication environment measurement section 133. Then, the transmission/reception control section 132 determines a communication control method, depending on whether the communication environment is of a short distance or of a long distance.

First, a case where the communication environment is of a long distance is described.

If BT communication by the wireless device 2 is asynchronous communication and the communication environment of WLAN communication is of a long distance, the transmission/reception control section 132 performs control to perform BT communication by the wireless device 2 and WLAN communication by the wireless device 1 by time division. Hereinafter, the time division control is described in detail, using FIGS. 12 and 13.

Figure 12:
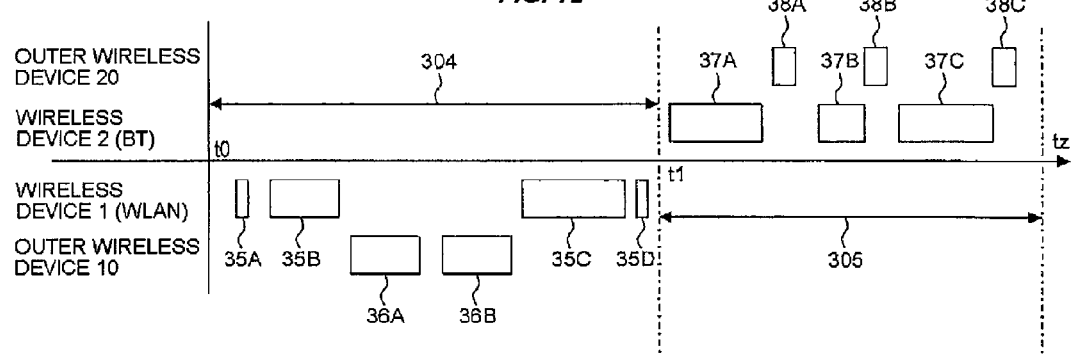
FIG. 12 shows data transmission timing in communications by the wireless device 1 and the wireless device 2 by time division.

FIG. 12 shows a timing of data transmission in performing BT communication by wireless device 2 and WLAN communication by the wireless device 1 by time division. In the figure, the upper half of the figure shows the timing of communication in BT communication, and the lower half of the figure shows the timing of communication in WLAN communication. Reference numerals 35A to 35D represent data transmitted from the wireless device 1, and reference numerals 36A and 36B represent data transmitted from the outer wireless device 10. Further, reference numerals 37A to 37C represent data transmitted from the wireless device 2, and reference numerals 38A to 38C represent data transmitted from the outer wireless device 20. Still further, the period represented by reference numeral 304 is a communicable period assigned to WLAN communication by time division, and the period represented by reference numeral 305 is a communicable period assigned to BT communication by time division.

FIG. 13 is a flowchart showing a control method for performing BT communication and WLAN communication by time division.

If the determination result of the WLAN communication environment is a short distance, the determination result having been received from the communication environment measurement section 133, the transmission/reception control section 132 asserts the communication status signal 501 by controlling the usage status notification section 131 at a timing of t0 in FIG. 12, and also transmits a frame including a power-saving release notice to the outer wireless device 10 (S301). The power-saving termination notice may be transmitted, being included in the first transmission frame 35A in FIG. 12. The wireless device 2 stops BT communication, and the outer wireless device 10 is enabled to transmit data. Then, WLAN communication is started between the wireless device 1 and the outer wireless device 10 (S302). WLAN communication is continued until a predetermined time has elapsed (S303). The predetermined time is the communicable time 304 that is assigned to WLAN communication under time division control, and the value of the communicable time 304 is set in a resistor in the communication control section 13 in advance. Likewise, the value of the communicable time 305 assigned to BT communication is also set in a resistor or the like. The transmission/reception control section 132 assigns the communication times of BT communication and WLAN communication by time division, with reference to the values in the resistors or the like.

The transmission/reception control section 132 controls the usage status notification section 131 at a timing t1 when the communicable time 304 has elapsed to negate the communication status signal 501, and transmits a frame including a power-saving notice to the outer wireless device (S304). The power-saving notice may be transmitted, being included in the last transmission frame 35D in FIG. 12. Thus, the wireless device 2 is enabled to perform BT communication, and the outer wireless device 10 stops data transmission. Then, the wireless device 2 starts BT communication (S305). Meanwhile, the transmission/reception control section 132 measures the elapse of the communicable time 305 assigned to BT communication (S306). Then, the transmission/reception control section 132 controls the usage status notification section 131 at a timing of time t2 when the communicable time 305 has elapsed to assert the communication status signal 501, and transmits a power-saving termination notice to the outer wireless device 10 (S301). The wireless device 2 stops BT communication, and the outer wireless device 10 becomes able to transmit data. By repeating the above-mentioned process, communications by the wireless device 1 and the wireless device 2 are performed by time division.

If data transmission from the outer wireless device 10 (data reception by the wireless device 1) were not controlled, data may be transmitted from the outer wireless device 10 during communication by the wireless device 2. Further, if the distance between the wireless device 1 and the outer wireless device 10 is long, frame loss easily occur because the effect of power interference becomes more significant. Accordingly, in data transmitted from the outer wireless device 10 during communication by the wireless device 2, frame loss easily. In the present embodiment, in case that BT communication is asynchronous and the WLAN communication environment is of a long distance, data transmissions from the wireless device 1 and the wireless device 2 are performed separately by time division, and data transmission from the outer wireless device 10 is stopped during periods where the wireless device 2 is able to perform BT communication. Because interference by the mutual communications is prevented, the communication qualities can be maintained high, and occurrence of frame loss in data transmitted from the outer wireless device 10 can be reduced.

A case where the communication environment is of a short distance is described.

If BT communication by the wireless device 2 is asynchronous and the WLAN communication environment is of a short distance, the transmission/reception control section 132 performs priority control, corresponding to the communication status signal 502 and the priority signal 503 of the wireless device 2. If the timing of BT communication by the wireless device 2 and that of WLAN communication by the wireless device 1 overlap with each other, the status monitoring section 12 determines whether or not to continue WLAN communication by wireless device 1, corresponding to the priority signal 503, and makes an instruction to the transmission/reception control section 132. If the priority signal 503 is asserted (high priority), the status monitoring section 12 instructs the transmission/reception control section 132 to stop WLAN communication of the wireless device 1. If the priority signal 503 is not asserted (low priority), the status monitoring section 12 instructs the transmission/reception control section 132 to continue WLAN communication by the wireless device 1. Determination whether or not to continue communication may be carried out by the status monitoring section 12, and may be carried out by the transmission/reception control section 132 having received a detection result of the communication status signal 502 and the priority signal 503 from the status monitoring section 12.

FIG. 14 is a flowchart showing a method of communication control corresponding to the communication status and the priority of the wireless device 2.

If the determination result of the environment of WLAN communication having received from the communication environment measurement section 133 is a short distance, the transmission/reception control section 132 first transmits a frame including a power-saving termination notice to the outer wireless device 10 (S401). Herein, the power-saving termination notice may be transmitted, being included in the first transmission frame similarly to FIG. 12. Data transmission from the outer wireless device 10 is enabled. Then, based on instruction by the status monitoring section 12 as to whether or not to continue communication, the transmission/reception control section 132 controls WLAN communication (S402). A concrete control method in step S402 is as follows.

FIG. 15 shows a data transmission timing in communication corresponding to the communication status and the priority of the wireless device 2.

In the figure, after notifying the power-saving termination, the transmission/reception control section 132 controls the usage status notification section 131 at the timing of time t0 to assert the communication status signal 501, and then starts WLAN communication. After that, when the wireless device 2 asserts the communication status signal 502 to perform BT communication at the timing of time t1 when the wireless device 1 is performing transmission of data 401 by WLAN communication, the status monitoring section 12 of the wireless device 1 detects the communication status signal 502 and determines the priority signal 503. Because the priority signal 503 is not asserted at that time, the status monitoring section 12 instructs the transmission/reception control section 132 to continue WLAN communication. Upon receiving the instruction, the transmission/reception control section 132 continues to perform WLAN communication, and maintains the communication status signal 501 of the wireless device 1 asserted. Because the communication status signal 501 is not negated, the wireless device 2, after a certain time has elapsed, negates the communication status signal 502 once, the communication status signal 502 having been asserted as described above, and does not perform BT communication. After that, when the data transmission by the wireless device 1 is terminated at time t2 and the communication status signal 501 of the wireless device 1 is negated, the wireless device 2 again asserts the communication status signal 502, and starts transmitting data 402 by BT communication. Then, when the wireless device 2 has terminated communication at time t3, the wireless device 2 negates the communication status signal 502. Further, during the period from time t2 to time t3 when the wireless device 2 is performing communication, as the outer wireless device 10 is permitted to transmit data by the above-mentioned power-saving termination notice, the outer wireless device 10 transmits data 403 and 404 to the wireless device 1.

After that, the wireless device 1 again starts WLAN communication at time t4, and transmits data 405. Then, at time t5 during transmission of the data 405, when the wireless device 2 asserts the communication status signal 502 to perform communication and asserts the priority signal 503 to make a request for BT communication, the status monitoring section 12 of the wireless device 1 detects the communication status signal 502 and determines the priority signal 503. Because the priority signal 503 is asserted at that time, the status monitoring section 12 instructs the transmission/reception control section 132 to stop data transmission. On receiving the instruction, the communication control section 13 stops data transmission, and negates the communication status signal 501. Thus, BT communication by the wireless device 2 is started, and data 406 is transmitted. Although the priority signal 503 is issued together with the communication status signal 502, the ratio of issuance is set in advance in a resistor or the like in the communication control section 13, and the transmission/reception control section 132 has the priority signal 503 issued corresponding to the setting.

After that, when BT communication by the wireless device 2 ends at time t6 and the communication status signal 502 and the priority signal 503 of the wireless device 2 are negated, the transmission/reception control section 132 asserts the communication status signal 501 to transmit data 407. Through the above-mentioned process, priority control is performed, corresponding to the communication status and the priority of the wireless device 2.

If the distance between the wireless device 1 and the outer wireless device 10 is short, because the attenuation of the transmission/reception power in WLAN communication is comparatively small, the effect of power interference is small, if any, and the possibility of occurrence of frame loss is low. In this situation, in the present embodiment, in case that BT communication is asynchronous communication and the WLAN communication environment is of a short distance, data transmission from the outer wireless device 10 is not stopped even during a period where the wireless device 2 is performing BT communication. Compared with stopping data transmission from the outer wireless device 10 during BT communication, drop in throughput can be reduced. Further, as the wireless device 1 and the wireless device 2 adjust the timing of own communications, corresponding to the mutual communication statuses, drop in throughput can be reduced, compared with performing communications by time division.

As described above, by the wireless communication terminal 100 in the present embodiment, the wireless device 1 that performs WLAN communication recognizes the communication status by analyzing a pattern of the communication status signal 502 of BT communication by the wireless device 2, and based on it, the wireless device 1 performs communication control of WLAN communication and BT communication. Thus, it is possible to reduce occurrence of frame loss due to power interference, and reduce drop in throughput, compared with a method that performs communication control uniformly by time division. Further, when it was assumed that communication control is performed with a priority signal, when contention between timings of frame transmission of BT communication and WLAN communication occurs, WLAN communication may be stopped by the priority signal of the wireless device 2 and frame loss may thereby occur. As in the present embodiment, by performing WLAN communication in non-communication periods 302 instead of performing equal control with a priority signal, frame loss due to issuance of a priority signal does not occur in WLAN communication. Further, according to the present embodiment, not only data transmission from the wireless communication terminal 100 but also data transmission from the outer wireless device 10 are controlled, and then communication quality can be maintained higher. Further, because control of data transmission from the outer wireless device 10 is performed using the power-saving function of the wireless device 1, if WLAN communication is performed by a wireless system in conformity with IEEE 802.11 standard, an existing protocol can be used, without the necessity of preparing a new protocol for transmission control of the outer wireless device 10.

The present invention developed by the inventors has been concretely described, based on embodiments. The invention is not limited to itself. It is needless to say that various changes and modifications are possible without departing from the invention.

In the present embodiment, the description has been made, taking an example of a wireless communication terminal that performs wireless communication in conformity with IEEE 802.11 standard and wireless communication in conformity with Bluetooth standard. Without being limited itself, the invention can be also applied to a wireless communication terminal that performs wireless communication in conformity with other standards.

Further, in the time division control, shown in FIG. 12, instead of fixing the communicable times 304 and 305 assigned to BT communication and WLAN communication, it is also possible to dynamically change the communicable times. When the wireless device 2 performs streaming communication, such as music, with a high communication frequency, communication quality can be improved by making the communicable time 305 of the wireless device 2 long.

For the wireless communication terminal 100 in the present embodiment, a case of connecting the wireless device 1 and the wireless device 2 with three lines (501, 502, and 503) has been shown as an example. Without being limited to the connection, arrangement by connection with two lines of the mutual communication status signals 501 and 502, as shown in FIG. 2, may be made. In this case, in the control shown in FIG. 15, the status monitoring section 12 does not determine the priority signal 503, but determines whether or not to continue communication, based on the communication status signal 502.

What is claimed is:

1. A method of wireless communication, comprising the steps of:
   a) generating a communication status signal in a predetermined period of time which is set to a first value while a first wireless communication is operating and set to a second value while the first wireless communication is not operating in the predetermined period of time;
   b) analyzing the communication status signal;
   c) enabling a second wireless communication that is different from the first wireless communication when the communication status signal is not set to the first value in the predetermined period of time;
   d) suspending the second wireless communication when a total time of the communication status signal set to the first value reaches or exceeds a predetermined value in the predetermined period of time;
   e) when the communication status signal does not reach the predetermined value in the predetermined period of time and the communication status signal is cyclic, enabling a second wireless communication while the level of the communication status signal is the second value.

2. The method of wireless communication according to claim 1, further comprising the step of:
   f) when the communication status signal does not reach the predetermined value in the predetermined period of time and the communication status signal is not cyclic, enabling the second wireless communication based on a signal intensity of at least one of the second wireless communication and the first wireless communication.

3. The method of wireless communication according to claim 1, further comprising the step of:
   f) when the communication status signal does not reach the predetermined value in the predetermined period of time and the communication status signal is not cyclic, enabling the first wireless communication or the second wireless communication depending on a value of a priority signal.

4. The method of wireless communication according to claim 1, wherein the first wireless communication is in a 2.4 GHz band.

5. The method of wireless communication according to claim 1, wherein the second wireless communication is in a 2.4 GHz band.

6. A method of wireless communication, comprising the steps of:
   a) generating a communication status signal in a predetermined period of time which is set to a first value while first wireless communication is operating and set to a second value while the first wireless communication is not operating in the predetermined period of time;
   b) analyzing the communication status signal;
   c) enabling a wireless LAN communication that is different from the first wireless communication when the communication status signal is not set to the first value in the predetermined period of time;
   d) suspending the wireless LAN communication when a total time of the communication status signal set to the first value reaches or exceeds a predetermined value in the predetermined period of time;
   e) when the communication status signal does not reach the predetermined value in the predetermined period of time and the communication status signal is cyclic, enabling a wireless LAN communication while the level of the communication status signal is the second value,
   wherein the first wireless communication complies with an IEEE 802.15 standard.

7. The method of wireless communication according to claim 6, further comprising the step of:
   f) when the communication status signal does not reach the predetermined value in the predetermined period of time and the communication status signal is not cyclic, enabling the wireless LAN communication based on a signal intensity of at least one of the wireless LAN communication and the first wireless communication.

8. The method of wireless communication according to claim 6, further comprising the step of:
   f) when the communication status signal does not reach the predetermined value in the predetermined period of time and the communication status signal is not cyclic, enabling the first wireless communication or the wireless LAN communication depending on a value of a priority signal.

9. The method of wireless communication according to claim 6, wherein the first wireless communication is in a 2.4 GHz band.

10. The method of wireless communication according to claim 6, wherein the wireless LAN communication is in a 2.4 GHz band.

* * * * *